US005211351A

United States Patent [19]

DeClerck

[11] Patent Number: 5,211,351

[45] Date of Patent: May 18, 1993

[54] HOSE LOADER

[76] Inventor: Ronald J. DeClerck, 37950 Utica Rd., Sterling Heights, Mich. 48312

[21] Appl. No.: 677,402

[22] Filed: Mar. 28, 1991

[51] Int. Cl.[5] .......................... B65H 75/40; F16L 3/00

[52] U.S. Cl. .............................. 242/86.2; 137/355.28; 296/37.6

[58] Field of Search ................... 242/86.2, 68.7, 86 R; 137/355.12, 355.28; 280/762, 769, 163, 164.1; 296/37.6

[56] References Cited

U.S. PATENT DOCUMENTS

| | | | |
|---|---|---|---|
| 1,902,611 | 3/1933 | Blackman et al. | 242/68.7 |
| 2,139,484 | 12/1938 | Baird | 242/86.2 |
| 3,210,117 | 10/1965 | Hall | 280/769 X |
| 3,381,705 | 5/1968 | Murphy | 137/355.28 |
| 3,627,224 | 12/1971 | Diggs | 242/86.2 |
| 3,946,964 | 3/1976 | Zinser | 242/86 |
| 4,288,047 | 9/1981 | Berry et al. | 242/86 |
| 4,366,933 | 1/1983 | Broussard | 242/86.2 X |
| 4,629,390 | 12/1986 | Burke | 242/86.2 X |
| 4,671,315 | 6/1987 | Gardner | 252/86.5 X |
| 4,936,079 | 6/1990 | Skalsky et al. | 242/68.7 X |
| 4,941,703 | 7/1990 | Curry | 296/37.6 |

FOREIGN PATENT DOCUMENTS

| | | | |
|---|---|---|---|
| 120034 | 6/1930 | Fed. Rep. of Germany | 137/355.28 |

*Primary Examiner*—Daniel P. Stodola
*Assistant Examiner*—John Rollins
*Attorney, Agent, or Firm*—Gregory T. Zalecki

[57] ABSTRACT

A hose loading/unloading device which includes generally, a pair of rollers, a frame and a cradle assembly for attaching the frame to a vehicle. The frame consists of two pieces of rectangular steel tubing held in a parallel position by cross members. Two rollers are mounted between the side rails of the frame. The distance between the rollers is set to accept a coil of fire hose. This roller/frame assembly is attached to the underside of a vehicle by way of two cradle assemblies. They form a channel for the roller/frame assembly to open and close. They provide for support and storage of the roller/frame assembly. Additionally, a mechanical locking mechanism is attached to the rear cradle assembly. This permits the locking in place of the roller/frame assembly when it is not in use. A handle is attached to one end of the roller/frame assembly. This facilitates the opening and closing of the loader. Fire hose can be loaded onto a fire truck bed by placing a coil of fire hose upon the roller/frame assembly while in its open position. The free end of the coil is directed down and toward the loading area. The free end is then pulled causing the rollers to rotate and the coil to unwind. As the hose is pulled from the coil it is stacked into the loading area.

2 Claims, 3 Drawing Sheets

HOSE LOADER

BRIEF SUMMARY OF INVENTION

This invention is a device for loading hose.

During the fighting of a fire a hose, or series of hoses, are used to direct water from its source to the fire. Fire hose is typically connected to a fire hydrant which provides a source of water to the fire truck. A pumping mechanism within the truck increases the water pressure to a degree which is sufficient for fighting fires. On some occasions it is necessary to connect the water exiting from the pumping mechanism of one fire truck to the pumping mechanism of another fire truck because of the pressure drop caused by longer distances between the water source and the point where the water is directed to the fire. This connection is also made by way of fire hose. Additionally, fire hose is connected at one end to the pumping mechanism exit of a fire truck and a nozzle adapted for fire fighting at the other end.

Irrespective of its mode of use fire hose has certain common qualities. It is flexible. When it is not filled with water it flattens and has no cross sectional opening. When it fills with pressurized water it assumes a rounded cross-sectional configuration. In its flattened state the hose can be rolled into a coil. In general (i.e. for both fire and non-fire applications), this type of hose is known as flexible large diameter hose. The flattened nature of the hose provides stability for the coiled hose which is not available for a non-flexible type of hose. This is because the non-flexible hose tends to retain a rounded cross section which is incompatible with stable coiling of the hose.

A trend exists for increasing diameters of fire hose. Ten years ago a typical section of fire hose was two and one half inches in diameter, fifty feet in length and forty-five pounds in weight. A common fire hose used today is one hundred feet in length, four inches in diameter and seventy-five pounds in weight. More modern fire departments use even larger hose such as fire hose which is one hundred feet in length, five inches in diameter and one hundred forty-five pounds in weight. Some fire departments even use six inch diameter hose which is heavier yet. The purpose of the larger hose is to increase the volume rate of water delivery. Not only does a larger diameter fire hose transmit more water at a given pressure differential, it also reduces pressure losses at a given flow rate. Although the larger diameter hose provides substantially better flow rates, it is more difficult to handle and store because of its weight and size.

During its use fire hose is laid out onto the ground. After its use the hose must be collected and stored.

The traditional method which a fire department uses for collecting and storing the fire hose after fire fighting duties have been completed is as follows. The fire truck drives slowly along side of the laid out fire hose while several crew members lift the fire hose and stack it onto the hose bed of the fire truck. The hose bed of a fire truck is a rectangular boxed area which opens at the rear of a fire truck and extends toward the front. See FIG. 4. The hose is stacked by overlaying lengths of the hose into the truck bed area.

This method of collecting and storing the fire hose is fraught with several problems. Typically this is a 4 to 5 person job consisting of a truck driver and 3 to 4 loaders. As the trend toward the use of larger diameter hose continues more work related injuries, such as back injuries, are occurring because of the increased physical exertion required to accomplish the hose storage. Additionally, injuries occur because the loading personnel are working on a moving vehicle. In fact, a National Fire Protection Association Fire Department Occupational Safety and Health Standard prohibiting this method of loading hose onto a moving truck has been adopted into law by same states. That standard requires all passengers on a fire truck in motion to be seated and belted.

The purpose of this invention is to facilitate a better method of hose loading. The basic form of the device consists of two rollers connected to a frame. The distance between the rollers is set to accept a coil of hose. The roller/frame assembly is attached to the truck by way of two cradle assemblies. These cradle assemblies permit storage of the hose loader as well as stability when the hose loader is extended to its operational mode. See FIG. 2 and FIG. 5.

The coil of hose to be loaded is placed upon the rollers of the hose loader. The free end of the hose is then pulled promoting rotation of the hose coil and rollers as well as an unwinding of the hose. As the hose unwinds it is then stacked onto the truck bed area which is proximally located to the hose loader. See FIG. 3 and FIG. 4. Since only two persons are required to unload and stack the hose using this technique the number of persons required to accomplish the job is minimized. The physical exertion of the loading personnel is minimized. Further, the loading personnel can perform their jobs while the truck is stationery.

This invention alleviates several of the problems associated with the traditional method of collecting and storing fire hose on a fire truck. Firemen using the traditional method would manually attempt to unload the coiled fire hose onto the hose bed of the fire truck. During this process they would be continuously lifting and bouncing the coil of hose. The hose would tend to tangle while it was being loaded onto the truck. A significant amount of physical exertion would be required in order to prevent the hose from twisting. The backs of the firemen handling the hose coil would be subject to significant strain because the hose coil is at ground level. The weight and bulky nature of the hose causes difficulty when manipulating it.

When this invention is used the operators do not need to bend their backs as much as they did using the traditional method because the hose coil is suspended from the ground by the hose loader roller/frame assembly. There is less twisting and tangling of the hose during the unloading process because the hose coil is in a vertical plane during the unloading process as compared to a horizontal plane using the traditional method.

Less manpower is required to complete the loading process with this invention as compared to the traditional method. The time to load hose is substantially reduced. Thus, the time that a fire truck is out of service because hose remains to be loaded after a fire is reduced. With this invention there is less damage to the hose because there is less impact and abrasion to the hose as compared to the traditional method. Manual dragging of the hose during the loading process is minimized.

This invention could also be used to unload hose from the hose bed of a fire truck. In this situation it is desired to removed the stacked hose from the hose bed in order to clean the hose bed, the hose itself, or perform other maintenance functions. During this process one of the ends of the stacked hose is wound into a small coil. The small coil is then placed upon the rollers and the coil is wound into a larger coil. Thus, stacked hose is taken from the hose bed and converted into wound coils.

DETAILED DESCRIPTION OF THE PREFERRED EMBODIMENT

Figure 1:
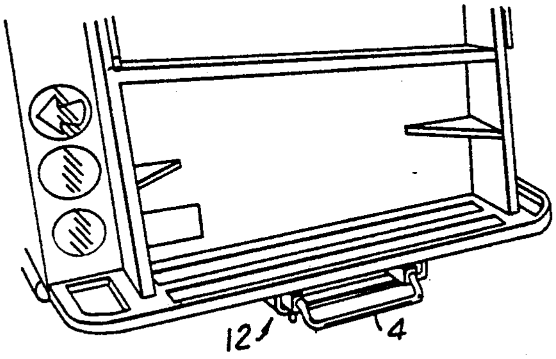
FIG. 1 is a perspective view of the preferred embodiment in the closed position.
Figure 2:
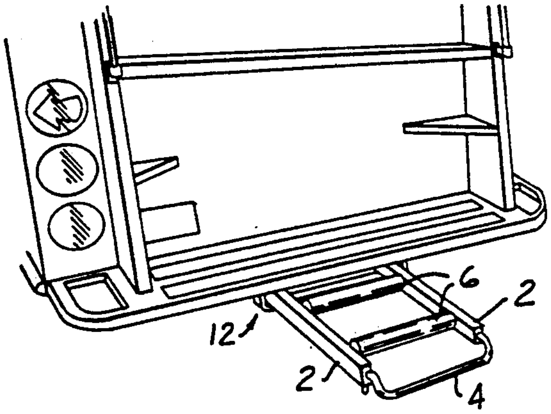
FIG. 2 is a perspective view of the preferred embodiment in the open position.
Figure 3:
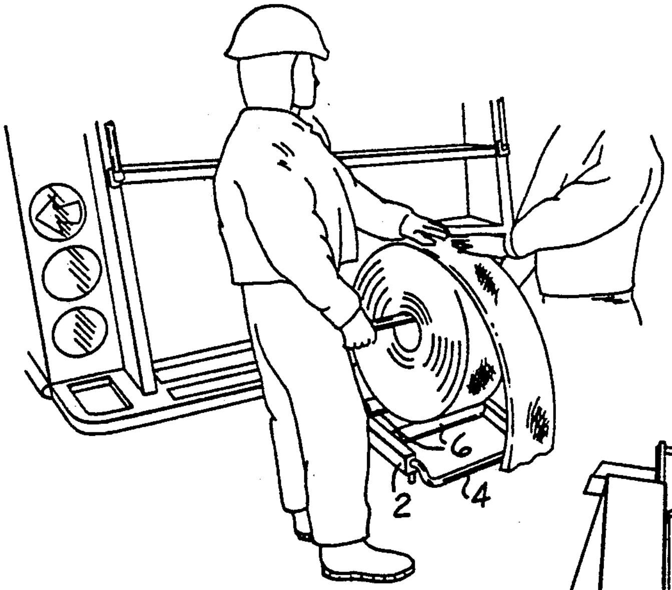
FIG. 3 is a perspective view showing a coil of fire hose supported by the invention and held in place by two firemen.
Figure 4:
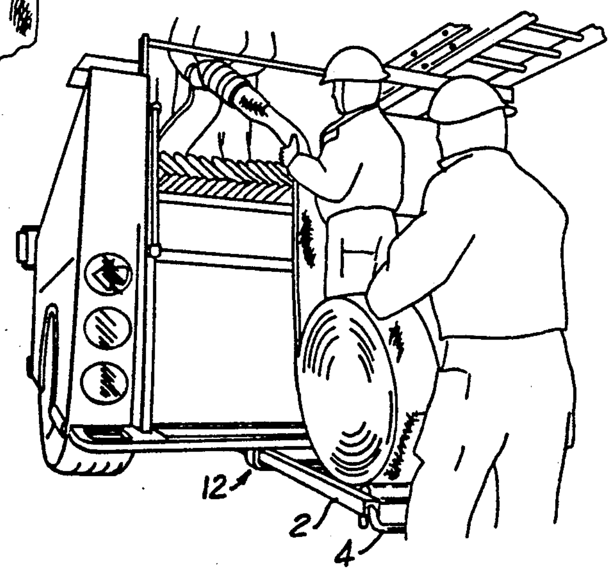
FIG. 4 is a perspective view showing a coil of fire hose supported by the invention and held in place by two firemen who are directing fire hose to a man above.

The preferred embodiment of this invention is shown in FIGS. 1-8 and FIGS. 10 and 11. A primary element of the hose loader is its frame 1. The purpose of the frame is to provide support for the rollers 6. It also supports and aligns the hose coil, attaches to the truck, and allows under truck storage. See FIGS. 3-5. The frame consists of side rails 2 made of rectangular steel tube which are held together by support cross members 3. The support cross members 3 ar constructed of angle iron. The optimum distance between the inner aspects of the side rails 2 is approximately one foot. A handle/-support brace 4 is constructed of round stock. The handle/support brace 4 is attached to the frame 1 at an angle which is thirty degrees below horizontal. This will facilitate easy, safe extension of the hose loader when it is moved from its stored position under a vehicle as indicated in FIG. 1 to its operational position as indicated in FIG. 2.

Figure 5:
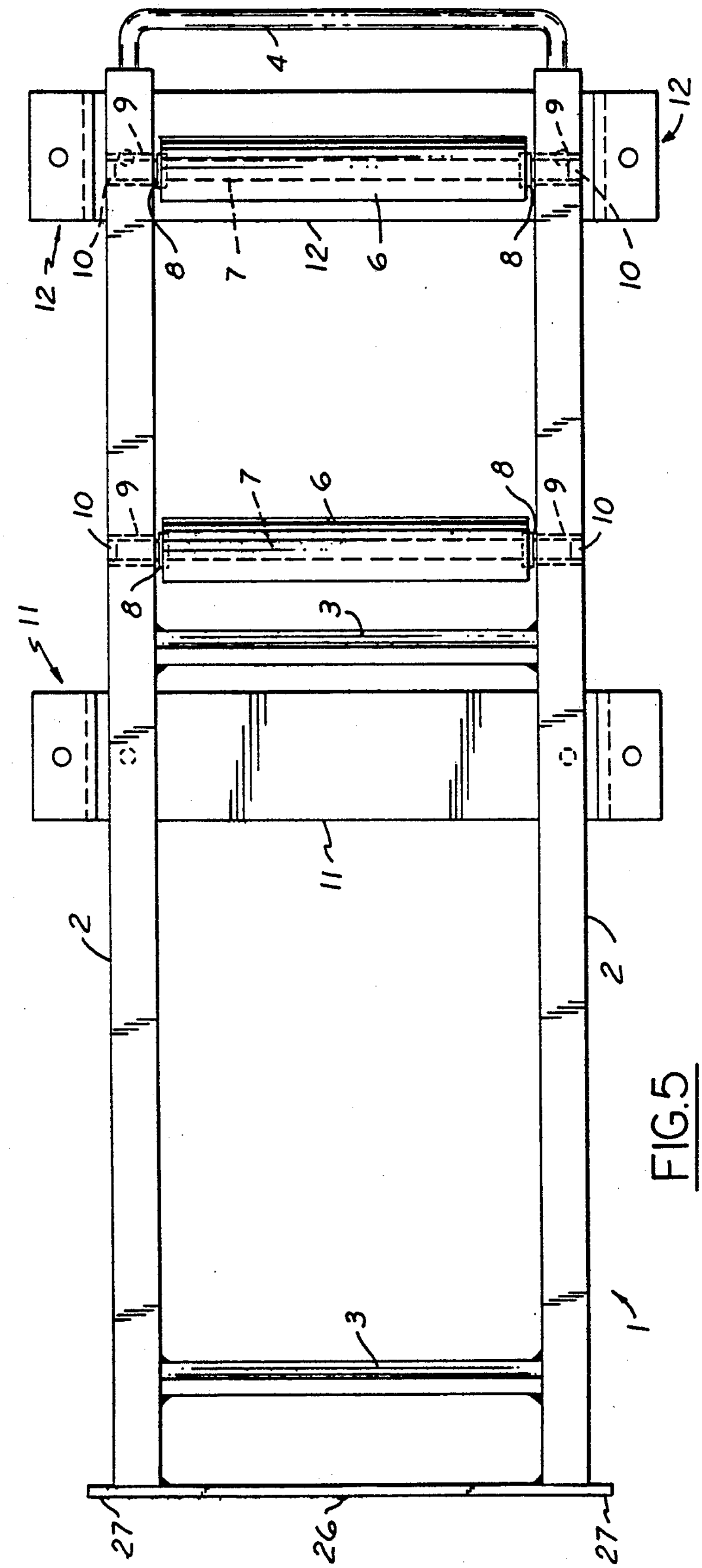
FIG. 5 is a plan view of the preferred embodiment.
Figure 6:
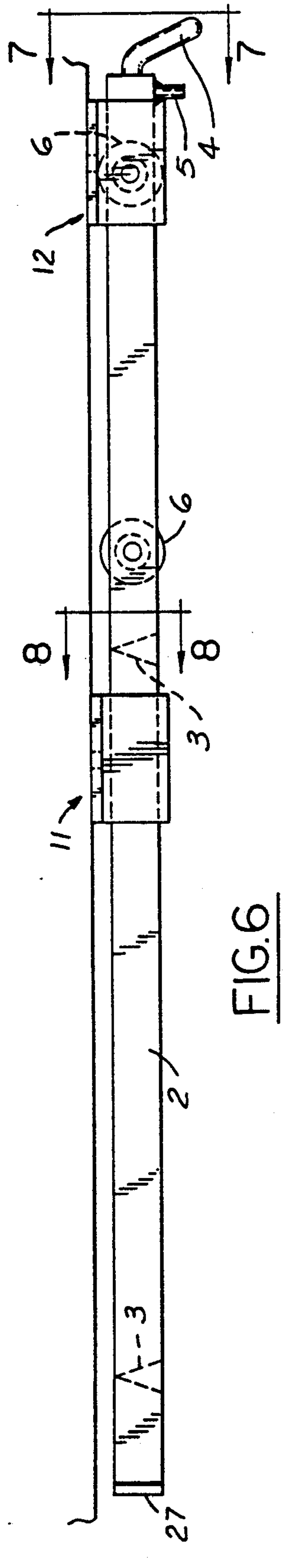
FIG. 6 is a side view of FIG. 5.
Figure 7:
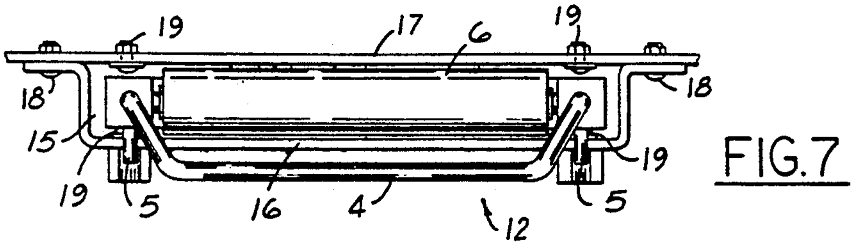
FIG. 7 is an end view of FIG. 6 shown in the direction of arrows 7—7.

The opened and closed positions (FIG. 1 and FIG. 2) are determined by rear position stops 5 and front position stops 27. For reference purposes rear means towards the rear of the truck and front means towards the front of the truck. Rear position stops 5 are constructed of round stock and affixed to the rear of each side rail as shown in FIG. 7. The front position stops 27 are constructed by attaching a piece of flat stock to the front of the side rails as shown in FIG. 5. The front position stops 27 allow the hose loader to be opened to its fully extended position as shown in FIG. 2 and no further. The front position stops 27 come into contact with the front cradle assembly bottom structure 13 in the fully extended position and the hose loader is thus prevented from extending any further. The rear position stops 5 permit the hose loader to be positioned from the open position as shown in FIG. 2 to the closed position as shown in FIG. 1. When the rear position stops 5 contact the rear cradle assembly bottom structure 16 the hose loader can be inserted no further under the truck. The rear position stops 5 also provide a means for retaining the hose loader in its closed position as described below.

Two rollers 6 are attached perpendicularly to the side rails 2. Each roller has a roller axle 7 about which the roller may rotate. Rotation of the roller about its axle is facilitated by the roller bearings s. The roller assembly 6, 7 and 8 is friction fit to the side rails 2. This is accomplished by the installation of bushings 9 into the side rails 2. The roller axle 7 is then press fit into the bushings 9. The bushings 9 are sealed into place by way of roll pins 10. The roll pins 10 are also press fit into the side rail 2. Thus the roller assembly may be removed and replaced by first removing the roll pins 10 and then using an elongated tool, such as a drift punch, to tap the roller axle 7 out of the bushing 9. A distance between the rollers is selected to permit the simultaneous rotation of a coil of hose, such as fire hose, in contact with the rollers hose and the rollers. The optimum distance between the rollers will permit the material coil to rotate without interference.

Figure 8:
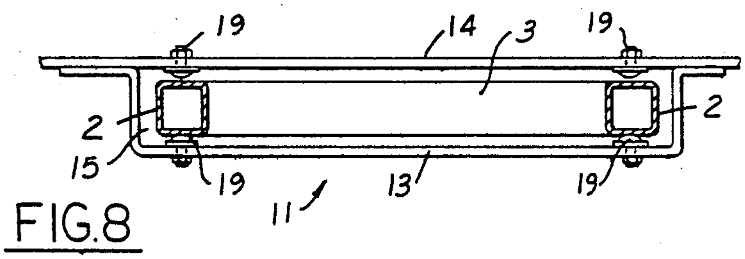
FIG. 8 is a section view taken along line 8—8 of FIG. 6.

A means of support for the roller/frame assembly is required. The best known use for the hose loader is its us to load coiled fire hose onto the bed of a fire truck proximally located. FIGS. 7 and 8 depict a means for supporting the frame and roller assembly on a fire truck. The support means consist of a front cradle assembly 11 and a rear cradle assembly. The front cradle assembly consists of a bottom structure 13 and a top structure 14. The rear cradle assembly consists of a bottom structure 16 and a top structure 17. The rear cradle assembly 12 is attached to the bottom of the fire truck near the rear center as shown in FIGS. 1 and 2. The front cradle assembly 11 is attached to the bottom of the fire truck in front of the rear cradle assembly 12. Thus a channel 15 is created which permits the extension of the roller/-frame assembly as shown in FIG. 2 as well as the storage of the roller/frame assembly as shown in FIG. 1.

The front cradle assembly 11 and rear cradle assembly 12 are attached to the bottom of the fire truck by way of bolts. The top and bottom cradle assemblies are also attached to each other by bolts 18. Bearing bolts 19 within the channel 15 provide an upper and lower bearing surface upon which the roller/frame assembly impinges and slides when it is opened or closed.

Figure 10:
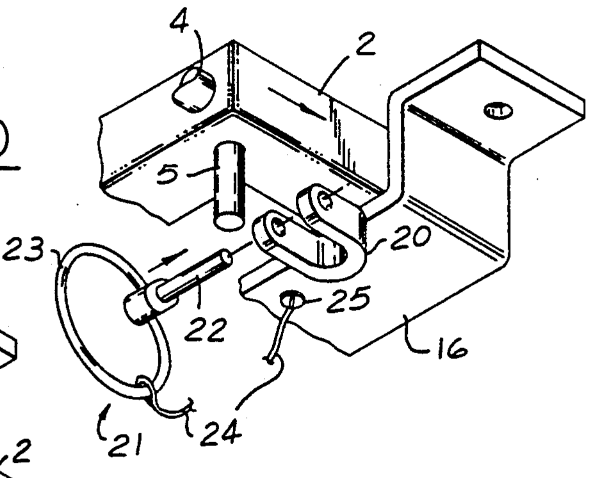
FIG. 10 is a perspective view of the locking assembly in the unlocked position.
Figure 11:
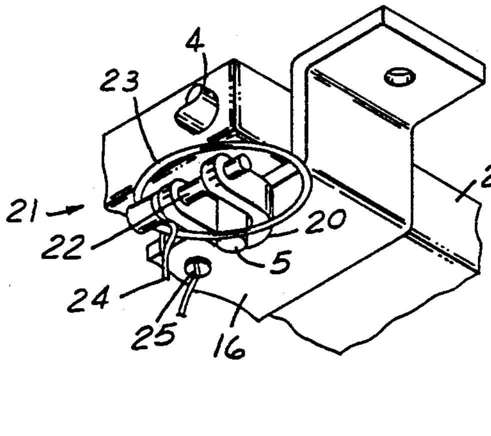
FIG. 11 is a perspective view of the locking assembly in the locked position.

When the roller/frame assembly is in its stored position as shown in FIG. 1, it is held secure in this position by the locking assembly shown in FIGS. 10 and 11. Each side of the rear of the roller/frame assembly is fitted with a position stop pin 5. A clevice 20 is attached to and positioned on one side of the rear cradle assembly 12 such that when the roller/frame assembly is pushed forward the position stop 5 enters the open channel of the clevice 20. The lynch pin assembly 21 is then used to lock the roller/frame assembly into place. This is accomplished by inserting the lynch pin assembly pin 22 into the clevice 20. A locking ring 23 is then pivoted about the lynch pin assembly pin 22 in order to securely lock the roller/frame assembly into place. The locking ring 23 is spring loaded such that it resists opening after it has been closed. The locking ring 23 is attached to the rear cradle assembly 12 by Way of a retaining chain 24 and bolt 25.

When the support means is constructed this way a number of additional benefits result. The support means and roller frame assembly are located under the vehicle when the roller/frame assembly is not in use. Thus the limited storage areas on a fire truck can be put to better use. The roller/frame assembly is made a part of the vehicle. There is no need to check the location of the roller/frame assembly in order to ensure that it is on the truck before each fire fighting service. This type of storage means also permits the roller/frame assembly to be easily opened and closed as shown in FIG. 1 and FIG. 2. Thus the roller/frame assembly is stored under the vehicle when it is not in use, yet is quickly available when needed.

This invention is typically used to load fire hose onto a fire truck bed after fire fighting services have been completed. After the completion of fire fighting services fire hose is laid out upon the ground. A small coil is started manually at one of the free ends of the fire hose. This small coil is then rolled into a larger coil by pushing the growing coil along the ground and on top of the remaining uncoiled fire hose. The coil of fire hose is then placed near the rear of the fire truck. The roller/frame assembly is extended from its closed position as shown in FIG. 1 to its open position as shown in FIG. 2. The coil of fire hose is lifted onto the rollers with its free end on the bottom of the coil and directed toward the fire truck bed. The free end of the fire hose coil is pulled causing the coil to unwind upon the rotating rollers 6. By continuing to pull the fire hose a fireman can load the hose onto the truck bed.

Figure 9:
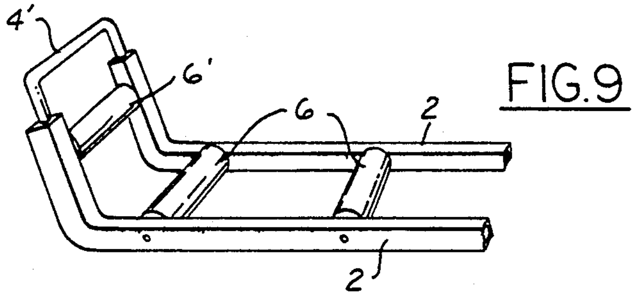
FIG. 9 is a second embodiment of the hose loader.

FIG. 9 depicts a modification of the hose loader wherein the side rails 2 are adapted to accept a third roller. The third roller is above and behind the rear roller shown in FIG. 2. The additional roller helps to align and stabilize larger coils of fire hose.

I claim:

1. An apparatus for loading and unloading fire hose coils onto and from a vehicle which comprises:
(a) a frame for supporting said coil;
(b) a pair of parallel rollers mounted to the frame with the distance between the respective axes of the rollers adapted such that said rollers support the coil of fire hose by the outer periphery of said coil whereby the simultaneous rotation of the coil of fire hose and the rollers is permitted; and
(c) a support means, which slidably supports the roller/frame assembly, attached to the underside of said vehicle.

2. An apparatus for loading and unloading flexible large diameter hose coils onto and from a vehicle which comprises:
(a) a frame for supporting said coil;
(b) a pair of parallel rollers mounted to the frame with the distance between the respective axes of the rollers adapted such that said rollers support the coil of flexible large diameter hose by the outer periphery of said coil whereby the simultaneous rotation of the coil of flexible large diameter hose and the rollers is permitted; and
(c) a support means, which slidably supports the roller/frame assembly, attached to the underside of said vehicle.

* * * * *